(12) United States Patent
Riefe et al.

(10) Patent No.: US 6,659,504 B2
(45) Date of Patent: Dec. 9, 2003

(54) STEERING COLUMN FOR A VEHICLE

(75) Inventors: Richard Kremer Riefe, Saginaw, MI (US); Marvin V. Manwaring, Clio, MI (US); Ray Garnet Armstrong, Bay City, MI (US); Ravindra Jwalapathy, Saginaw, MI (US); Stephen W. Skillman, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/133,819

(22) Filed: Apr. 25, 2002

(65) Prior Publication Data

US 2002/0171235 A1 Nov. 21, 2002

Related U.S. Application Data

(60) Provisional application No. 60/292,214, filed on May 18, 2001.

(51) Int. Cl.[7] .................................................. B62D 1/18
(52) U.S. Cl. ........................ 280/777; 280/775; 74/493
(58) Field of Search ................................ 280/777, 775, 280/779; 74/493

(56) References Cited

U.S. PATENT DOCUMENTS

| | | | |
|---|---|---|---|
| 5,524,927 A | * | 6/1996 | Toussaint .................... 280/777 |
| 5,669,634 A | | 9/1997 | Heinzman et al. |
| 5,704,641 A | | 1/1998 | Shimizu et al. |
| 5,722,299 A | * | 3/1998 | Yamamoto et al. ........... 74/493 |
| 5,787,759 A | * | 8/1998 | Olgren ........................ 74/493 |
| 5,788,279 A | | 8/1998 | Pfannebecker |
| 5,820,163 A | * | 10/1998 | Thacker et al. .............. 280/775 |
| 5,871,233 A | * | 2/1999 | Tanaka et al. ............... 280/777 |
| 6,139,057 A | * | 10/2000 | Olgren et al. ................ 280/775 |
| 6,224,104 B1 | | 5/2001 | Hibino |
| 6,419,269 B1 | * | 7/2002 | Manwaring et al. ........ 280/775 |

* cited by examiner

*Primary Examiner*—Paul N. Dickson
*Assistant Examiner*—David R. Dunn
(74) *Attorney, Agent, or Firm*—Michael D. Smith (57) ABSTRACT

A vehicle steering column has a rake adjustment mechanism which includes a rake bracket having a rake slot provided with rake slot teeth. A tooth lock is supported in the rake slot with teeth opposing the rake slot teeth. A rake bolt is rotatable to a first rotative position to move the tooth lock to a retracted position with the teeth of the tooth lock out of engagement with the rake slot teeth. The bolt is axially rotatable to a second rotative position permitting the tooth lock to be moved to a locking position by a spring in which the teeth of the tooth lock engage the rake slot teeth. The bolt, when in the second rotative position, is movable, in response to an application of an impact force on the steering column to collapse the steering column, into bearing engagement with the tooth lock to positively retain the tooth lock in the locking position. The steering column is also provided with a release mechanism having shear pins and an energy absorption mechanism.

15 Claims, 10 Drawing Sheets

PRE-CRASH ADJUSTMENT POSITION

FIG. 7A   FIG. 7B   FIG. 7C

PRE-CRASH LOCKED POSITION

STEERING COLUMN FOR A VEHICLE

CROSS REFERENCE TO RELATED APPLICATION

This application claims the benefit of U.S. provisional application Serial No. 60/292,214 filed May 18, 2001, the entire contents of which are incorporated herein by reference.

FIELD OF THE INVENTION

This invention relates generally to steering columns and more particularly to a steering column having improved locking, release and energy absorption mechanisms.

BACKGROUND OF THE INVENTION

Various locking mechanisms are known for use with steering columns capable of rake adjustment, such as that disclosed in co-pending U.S. patent application Ser. No. 09/664,032 dated Sep. 18, 2000, which is incorporated herein by reference. The locking mechanism in that co-pending application includes a rake bolt and associated tooth locks on both sides of the steering column. It would be desirable from the standpoint of both simplicity and cost, for the locking mechanism to have a single tooth lock on only one side of the steering column.

It is also known to provide a release mechanism to allow the steering column to collapse following a frontal impact event of great magnitude, such as a head-on collision. However, such release mechanisms typically are not aligned with the rake bolt and thus lead to undesirable moments being applied to the release mechanism upon impact.

Energy absorption mechanisms that allow the steering column to collapse at a controlled rate for the protection of the driver are also known. Such mechanisms, however, typically are not well integrated with the rake adjustment and release mechanisms.

SUMMARY OF THE INVENTION

The locking system of the present invention includes a tooth lock movable selectively into engagement with a toothed slot of a fixed bracket. The tooth lock is normally supported in meshing engagement with the toothed slot to lock the steering column in adjusted position, but is movable out of engagement with the toothed slot to enable the steering column to be adjusted. A rake bolt moves into positive engagement with the tooth lock to hold the tooth lock in meshing engagement with the toothed slot in response to an applied impact force on the steering column to prevent the steering column from accidentally moving away from adjusted position during controlled collapse of the steering column.

Further in accordance with the invention, the steering column has telescoping upper and lower jackets. The rake bolt extends through a tubular capsule. The capsule is connected to a compression bracket secured to the upper jacket by one or more shear pins. The shear pin or pins are adapted to shear to enable the steering column to collapse when the driver's chest hits the steering wheel in response to a frontal vehicle impact of great magnitude. A deformable energy absorbing strap extends over the capsule which serves as an anvil to bend and then restraighten the strap to absorb energy as the steering column collapses.

BRIEF DESCRIPTION OF THE DRAWINGS

The foregoing as well as other features, objects and advantages of this invention will become more apparent as the following description proceeds, especially when considered with the accompanying drawings, wherein.

DETAILED DESCRIPTION OF THE PREFERRED EMBODIMENTS

Figure 1:
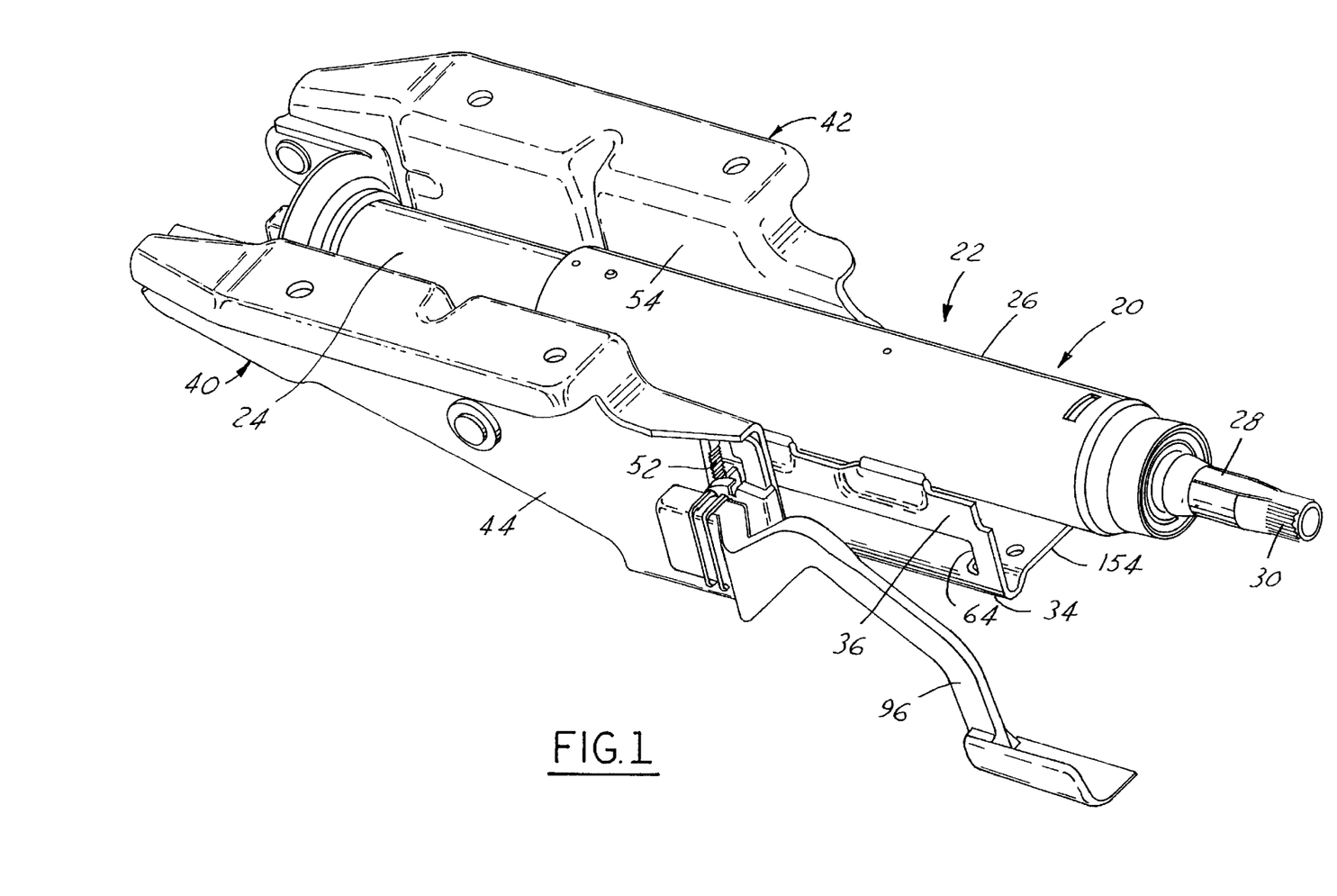
FIG. 1 is perspective view of a steering column and associated structure constructed in accordance with the invention.
Figure 2:
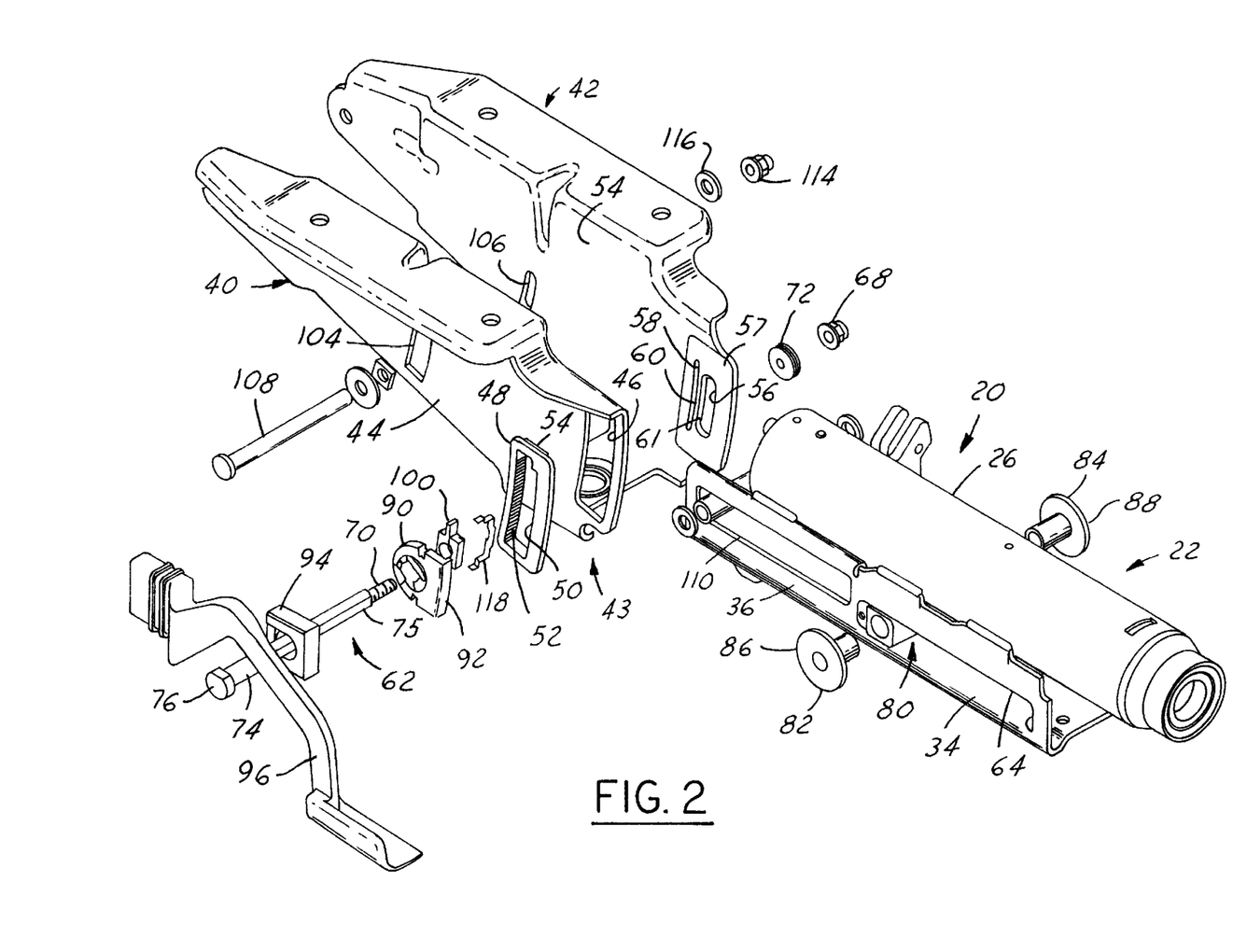
FIG. 2 is an exploded perspective view of the structure shown in FIG. 1.
Figure 3:
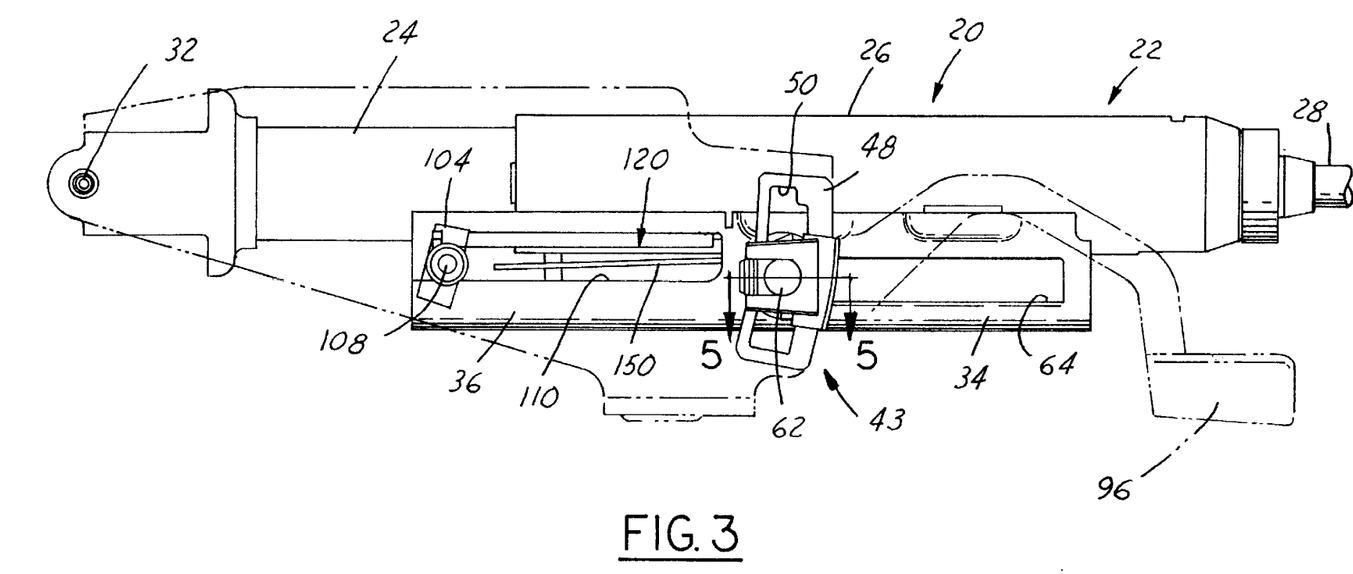
FIG. 3 is a side elevational view of the steering column and attached compression bracket, showing an operating handle in broken lines.

Referring now more particularly to the drawings, and especially FIGS. 1–3, a steering column 20 for an automotive vehicle has a jacket assembly 22 including a lower tubular jacket 24 telescoped in an upper tubular jacket 26. A steering shaft 28 is journaled for rotation in the jacket assembly 22. A steering wheel (not shown) has splines which engage splines 30 on the rear end of the steering shaft 28. The forward end of the lower jacket 24 receives a horizontal pivot pin 32 which attaches the steering column 20 to a vehicle frame for pivotal movement about a horizontal transverse rake axis of the pivot pin.

The upper jacket 26 extends lengthwise within an elongated, channel-shaped compression bracket 34 and is welded or otherwise rigidly secured parallel to opposite side walls 36 and 38 of the compression bracket.

Straddling the steering column 20 and the compression bracket 34 are a left side rake bracket 40 and a right side rake bracket 42. The rake brackets 40 and 42 are parts of a rake adjustment mechanism 43 for adjusting the vertical tilt, or rake, of the steering column 20 and are rigidly secured to a vehicle frame.

The left side rake bracket 40 has a vertical wall 44 formed with a generally vertically extending opening 46. An elongated rake plate 48 is secured to the outer side of the vertical wall 44 over the opening 46, and has a vertically elongated rake slot 50 generally in register with the opening 46. The rake slot 50 has a series of rake teeth 52 on its front edge. A pilot projection 54 on the inner side of the plate 48 is closely received and fits snugly in the opening 46 in the wall 44 of the left side rake bracket 40 to locate the plate 48.

The right side rake bracket 42 has a vertical wall 54 formed with a generally vertically elongated rake slot 56 in a portion 57 of the wall 54. The rake slot 56 in the wall 54 of the right side rake bracket 42 is in substantial transverse alignment with the rake slot 50 in the plate 48 on the wall 44 of the left side rake bracket 40. An elongated, generally vertical, narrow slit 58 in the wall 54 of the right side rake bracket 42 is generally parallel to, and closely spaced forwardly from the rake slot 56, providing a narrow, flexible, deformable strip 60 of the material of the wall 54 between the front wall 61 of the slot 56 and the slit 58.

A transverse, horizontal rake bolt 62 has ends 63 and 65 disposed in the respective rake slots 50 and 56 of the left and right side rake brackets 40 and 42. See FIGS. 2, 4 and 5. The rake bolt 62 also passes through the elongated, transversely aligned slots 64 and 66 which are formed in and extend lengthwise of the side walls 36 and 38 of the compression bracket 34 parallel to the steering column. A nut 68 is threaded on the threaded right end portion 70 of the bolt 62, clamping a thrust bearing 72 between the nut 68 and the wall 54 of the right side rake bracket 42. The rake bolt 62 is D-shaped in cross-section from a cylindrical portion 74 adjacent the polygonal head 76 of the bolt to the threaded end portion 70. The D-shaped cross section of the rake bolt 62 includes a flat surface 75.

The rake bolt 62 extends lengthwise within a transverse tubular capsule 80. See FIGS. 5 and 5A. The ends 81 and 83 of the capsule 80 extend through the slots 64 and 66 in the side walls 36 and 38 of the compression bracket 34. Bushings 82 and 84 in the ends of the capsule have heads 86 and 88 which extend across the ends 81 and 83 of the capsule in confronting relation to the vertical walls 44 and 54 of the side rake brackets 40 and 42. An annular cam 90 rotatable on the cylindrical portion 74 of the rake bolt 62 has a flange 92 engaged over an edge of the rake plate 48 to keep the cam from rotating. A cam follower 94 secured on the end of a tilt adjustment control handle 96 has a polygonal socket 98 fitted over the polygonal head 76 of the bolt 62 so that the bolt 62 is rotated when the handle 96 is turned. The cam 90 has a cam track 99 bearing against the cam follower 94.

Figure 5:
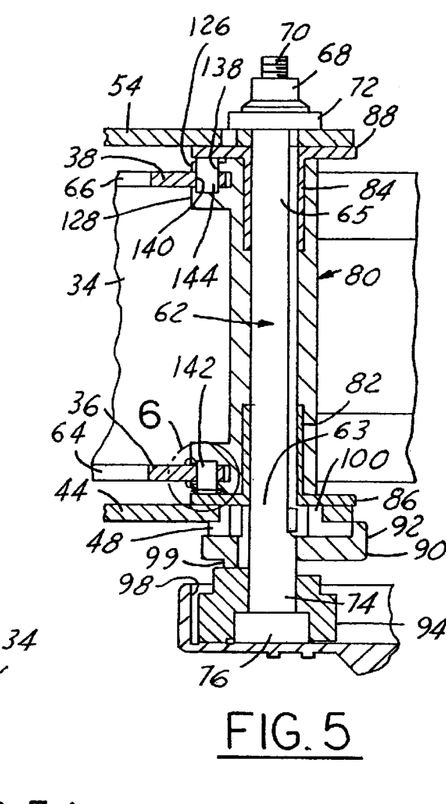
FIG. 5 is a sectional view taken on the line 5—5 in FIG. 3.

A left annular tooth lock 100 on the rake bolt 62 has a D-shaped hole 101 with a flat surface 103 and is generally similar to but slightly larger than the D-shaped rake bolt so that the rake bolt 62 may rotate relative to the tooth lock 100. The tooth lock 100 cannot rotate because it is generally rectangular and is confined between the walls of the rake slot 50. The tooth lock 100 is disposed in the rake slot 50 between the bushing head 86 and the cam 90 and has teeth 102 facing the rake teeth 52 in the rake slot.

The D-shaped rake bolt 62 extends through and is rotatable in the rake slot 56 in the vertical wall 44 of the right side rake bracket 40, but there is no associated tooth lock for the right side of the rake adjustment mechanism 43.

The left and right rake brackets 40 and 42 have transversely aligned, vertically elongated slots 104 and 106 in the vertical walls 44 and 54 thereof. The slots 104 and 106 are spaced forwardly from the rake slots 50 and 56. A bolt 108 extends through the slots 104 and 106 and also through the elongated, transversely aligned slots 110 and 112 which are formed in and extend lengthwise of the side walls 36 and 38 of the compression bracket 34 parallel to the steering column. A nut 114 is threaded on an end of the bolt 108, with a washer 116 between the nut and the side wall 38 of the compression bracket. The bolt 108 assists in stabilizing the steering column 20 but does not interfere with the vertical adjustment or collapse of the steering column.

Figure 7A:
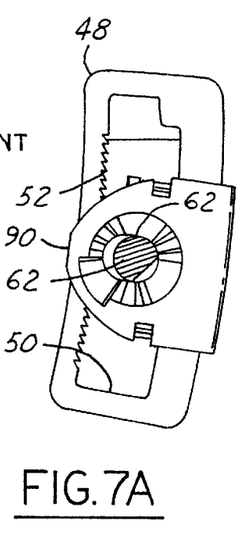
FIGS. 7A, 7B and 7C show the pre-crash adjustment position of the rake adjustment mechanism shown in FIGS. 2 and 4.
Figures 7B, 7C:
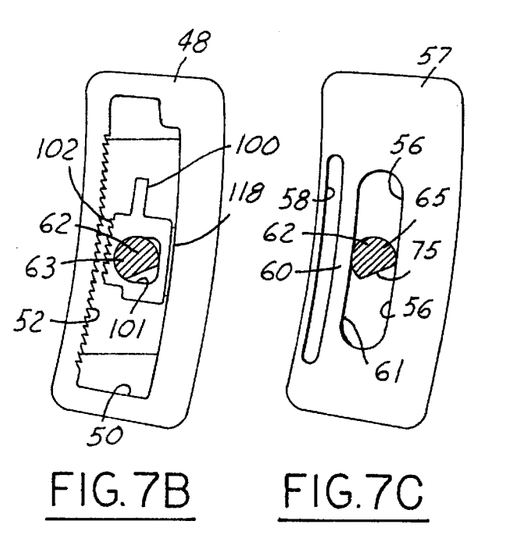
Figure 8A:
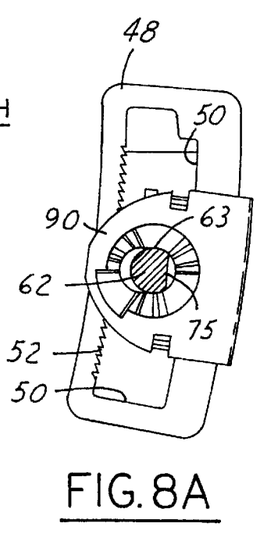
FIGS. 8A, 8B and 8C show the same mechanism in a pre-crash locked position.
Figure 8B:
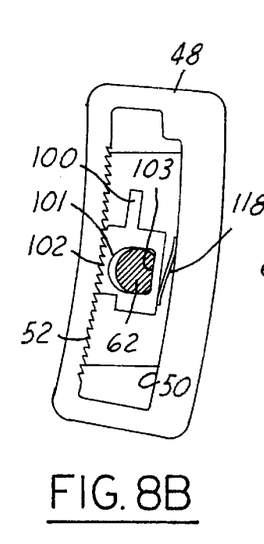
Figure 8C:
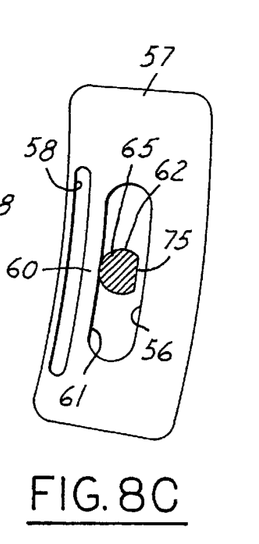

To adjust the vertical tilt of the steering column 20, the adjustment control handle 96 is raised from the position shown in FIGS. 1 and 3 so that the rake bolt 62 is rotated to the position shown in FIGS. 7A–7C. In this position of the rake bolt, the tooth lock 100 is withdrawn to the position of FIG. 7B to disengage its rake teeth 102 from the rake teeth 52 in the rake slot 50, freeing the steering column 20 for vertical adjustment. After the tilt of the steering column 20 is adjusted as desired, the rake bolt 62 is reverse rotated to the position of FIGS. 8A–8C, such that the flat surface 75 of the rake bolt is opposed to the flat surface 103 of the hole 101 in the tooth lock 100, enabling the tooth lock to be pressed forwardly by an actuator comprising a spring 118, causing the teeth 102 of the tooth lock to engage the teeth 52 in the rake slot 50. This engagement of the teeth 52 and 102 locks the steering column 20 in vertically adjusted position. The spring 118 is secured in the rake slot 50 opposite to rake teeth 52. With the rake bolt 62 reverse rotated to the position of FIGS. 8A–8C, the cam track 99 on the cam 90, in cooperation with the cam follower 94, causes the bushing heads 86 and 88 to be compressed against the walls 44 and 54 of the rake brackets 40 and 42 to frictionally resist movement of the steering column 20 away from the adjusted position.

Figures 4, 5A, 6:
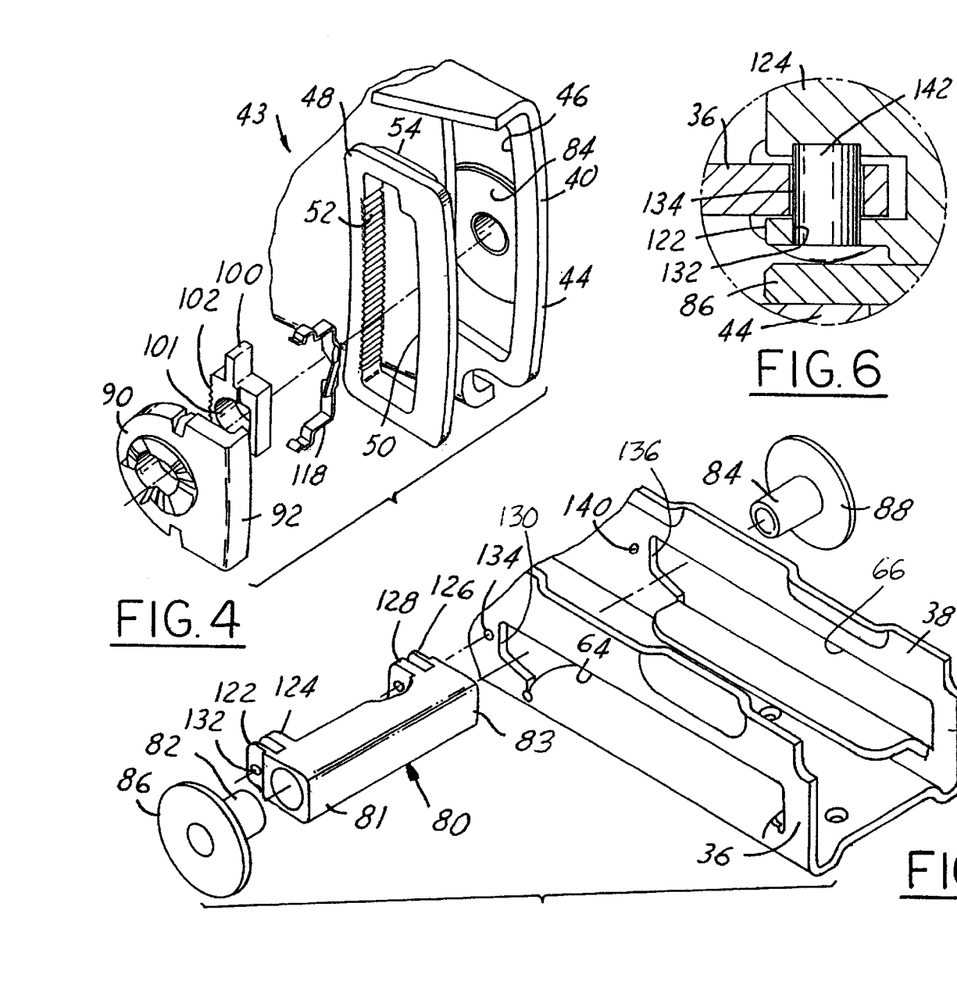
FIG. 4 is an exploded view in perspective showing certain parts associated with the rake adjustment mechanism.
FIG. 5A is an exploded perspective view of a tubular capsule, a portion of the compression bracket and bushings also shown in FIG. 5.
FIG. 6 is an enlargement of a portion of FIG. 5 shown within the circle 6 in FIG. 5.
Figure 10:
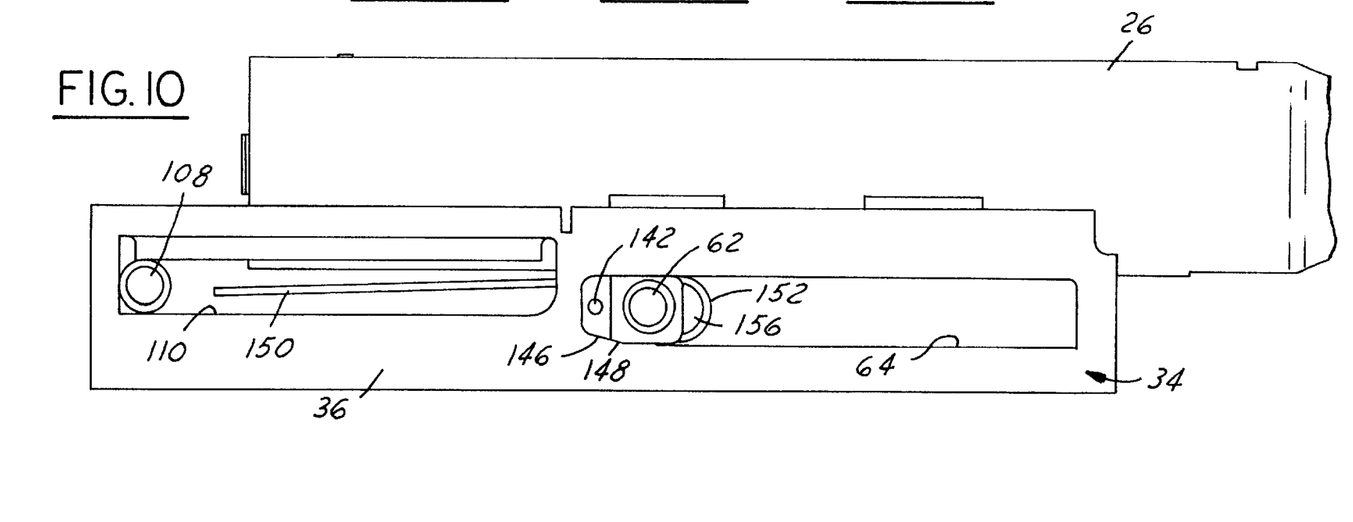
FIG. 10 is a side elevational view of the jacket of the steering column with attached compression bracket.
Figure 11:
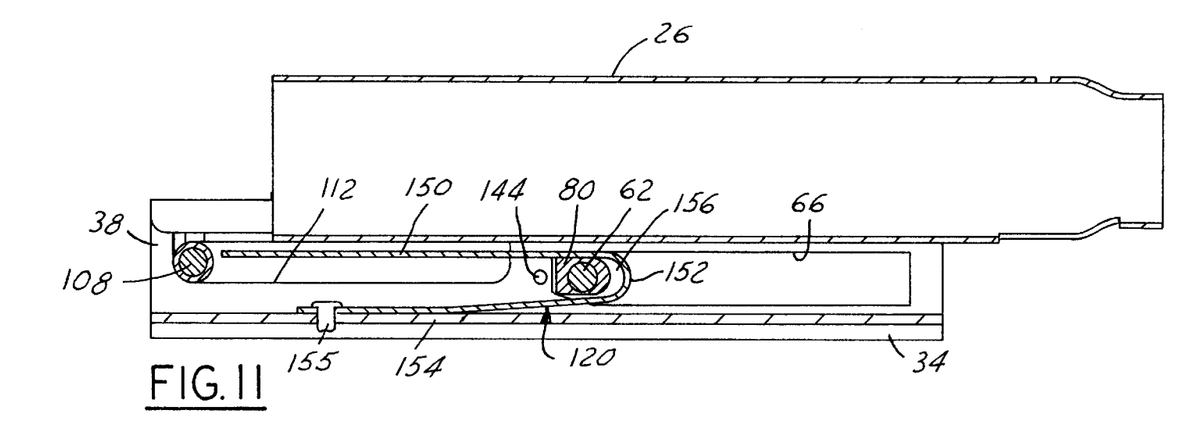
FIG. 11 is a view similar to FIG. 10 but is in section to better illustrate are energy absorption mechanism.
Figure 12:
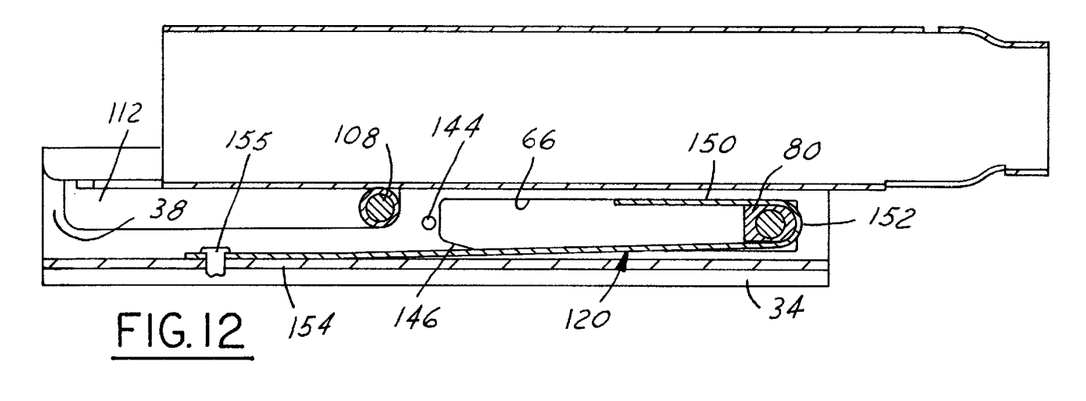
FIG. 12 is a view similar to FIG. 11 but shows the parts in a different position.

An energy absorption mechanism 120 is best shown in FIGS. 10–12. The capsule 80 is part of this mechanism. One end 81 of the capsule 80 has dual spaced apart flanges 122 and 124 and the opposite end 83 has dual spaced apart flanges 126 and 128 (FIGS. 5, 5A and 6). The flanges 122 and 124 embrace the side wall 36 of the compression bracket 34 at one end 130 of the slot 64 therein. The flange 122 has a hole 132 registering with a hole 134 in the wall 36. The flanges 126 and 128 embrace the side wall 38 of the compression bracket 34 at one end 136 of the slot 66 therein. The flange 126 has a hole 138 registering with a hole 140 in the wall 38. The registering holes 132 and 134 are injected with a flowable material such as a suitable plastic, for example Acetel, to produce a shear pin 142. The registering holes 138 and 140 are also injected with the same or similar material to produce a shear pin 144. The shear pins 142 and 144 retain the capsule 80 at the ends 130 and 136 of the slots 64 and 66 where such slots preferably have bottom wall portions 146 tapered about 15° to their lengthwise dimension. The ends 81 and 83 of the capsule 80 run on the bottoms of slots 64 and 66 and have similarly tapered bottoms 148.

A generally U-shaped energy absorption strap 150 of metal, for example, has a curved mid portion 152 extending around the capsule 80 and has one end 151 secured to a bottom wall 154 of the compression bracket 34 by a fastener 155. There is a space or gap 156 of about 5 millimeters, more or less, between the curved mid portion 152 of the strip 150 and the capsule 80.

In the event of a high impact load, such as a head-on collision, of sufficient magnitude to shear the pins 142 and 144 and to overcome the friction hold of the capsule heads 86 and 88 on the compression bracket 34, the steering column 20 will collapse causing the upper jacket 26 to telescope relative to the lower jacket 24. The energy absorption strap 150 will travel a few millimeters to take up the gap 156 before contacting the capsule 80. The gap 156 serves to eliminate the inertial effects associated with high initiation loads. It essentially separates the release loads so that they are not superimposed on one another. It also reduces the tendency of the capsule 80 to bind during the initial portion of the impact. This also prevents high initiation spike loads on impact.

During continuing collapse of the steering column 20 the strap 150 will be bent in an arc around the capsule 80 and then restraightened to absorb energy. The 15° taper of the bottom wall portions 146 at the forward ends of the slots 64 and 66 together with the similar taper of the bottoms 148 of the ends of the capsule 80 eliminate any lash between the slots and the capsule and also eliminate sticking of the capsule upon initial engagement of the curved portion 152 of the strap 150 with the capsule.

Figure 9A:
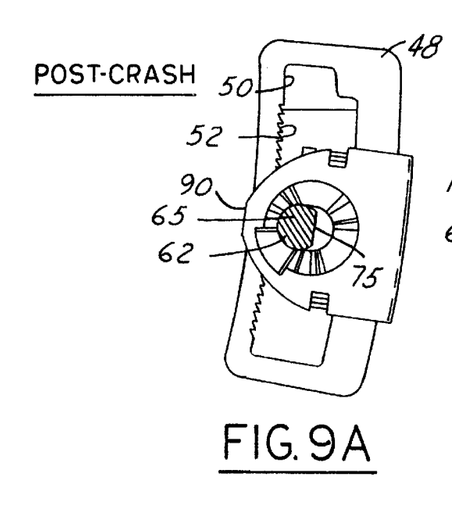
FIGS. 9A, 9B and 9C show the same mechanism in a post-crash condition.
Figure 9B:
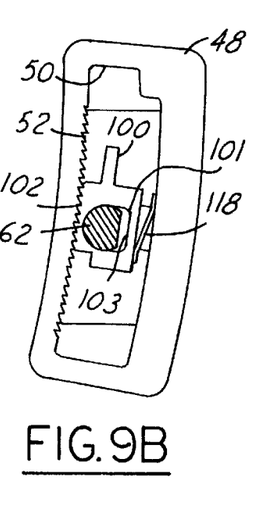
Figure 9C:
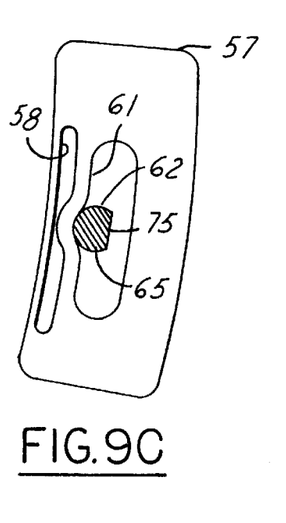

Also during collapse of the steering column 20 in response to a high impact load, the rake bolt 62 moves forwardly relative to the rake slot 50 (see FIGS. 9A–9C) so that that left end 63 of the rake bolt 62 positively engages and holds the tooth lock 100 in the position in which its teeth 102 engage the rake teeth 52 in the rake slot 50, thus preventing the steering column 20 from accidentally tilting upwardly. The bolt 62 moves forward during collapse of the steering column because the bolt is inside the capsule 80 which is being pushed forward by the strap 150. The right end 65 of the rake bolt 62 is normally prevented from moving forwardly by the front wall 61 of the rake slot 56 but on collapse of the steering column is permitted to move forwardly with the left end portion due to the deformation of the flexible strip 60 of the wall 54 between the slot 56 and the slit 58 (see FIG. 9C), thus preventing binding of the rake bolt.

Referring now to FIGS. 13–16, there is shown a modification of the invention which includes a steering column 180 having a jacket assembly 182 including a lower tubular jacket 184 telescoped within an upper tubular jacket 186. A steering shaft 188 extends lengthwise within the jacket 182 and has a splined rear end 190 to receive the splined opening in a steering wheel (not shown). A housing 192 supports the rear end of the upper jacket 186. A horizontal transverse pivot pin 194 pivots the front end of the steering shaft to enable up and down rake adjustment. Normally the steering column is supported at an angle A to the horizontal.

Figure 13:
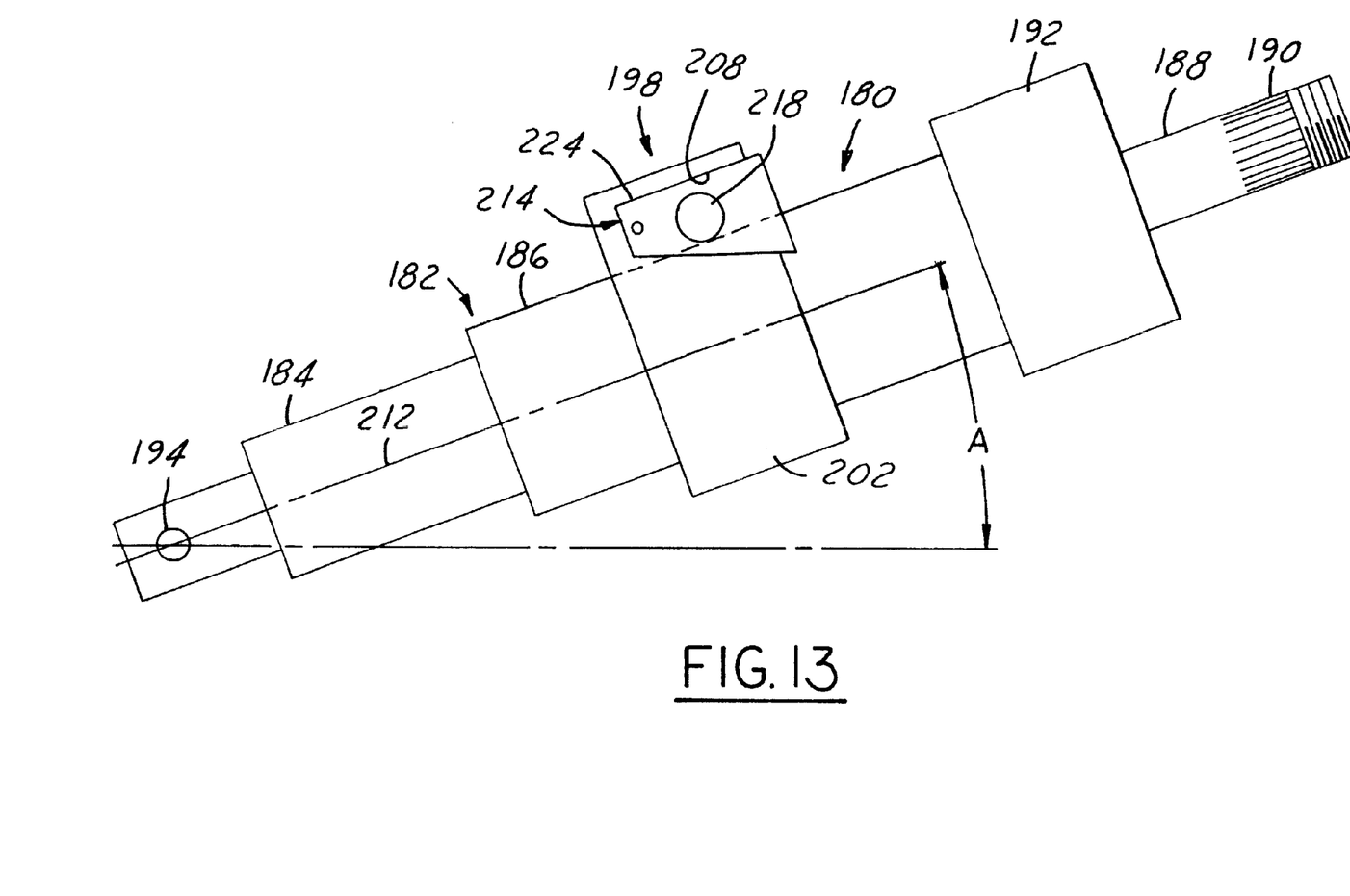
FIG. 13 is a side elevational view of a steering column and associated mechanism of a modified construction, also in accordance with the invention.
Figure 14:
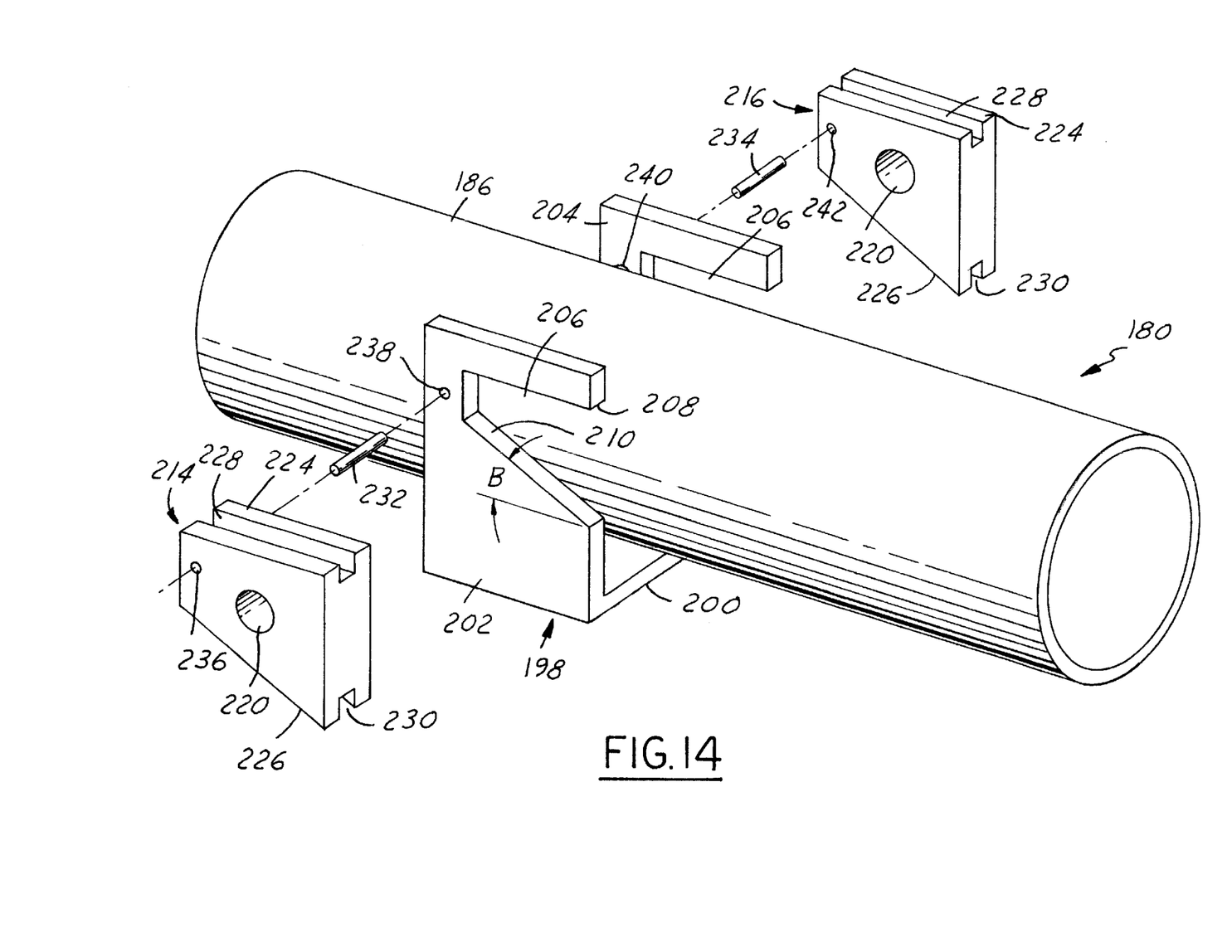
FIG. 14 is an exploded view in perspective of the structure shown in FIG. 13.
Figure 15:
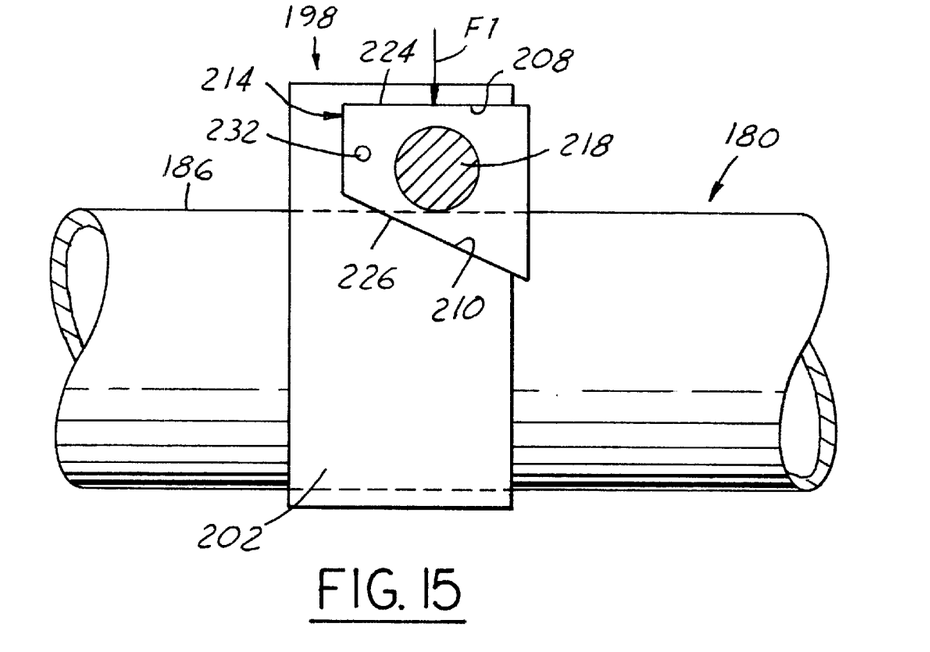
FIG. 15 is an enlarged view with parts in section of portions of FIG. 13.
Figure 16:
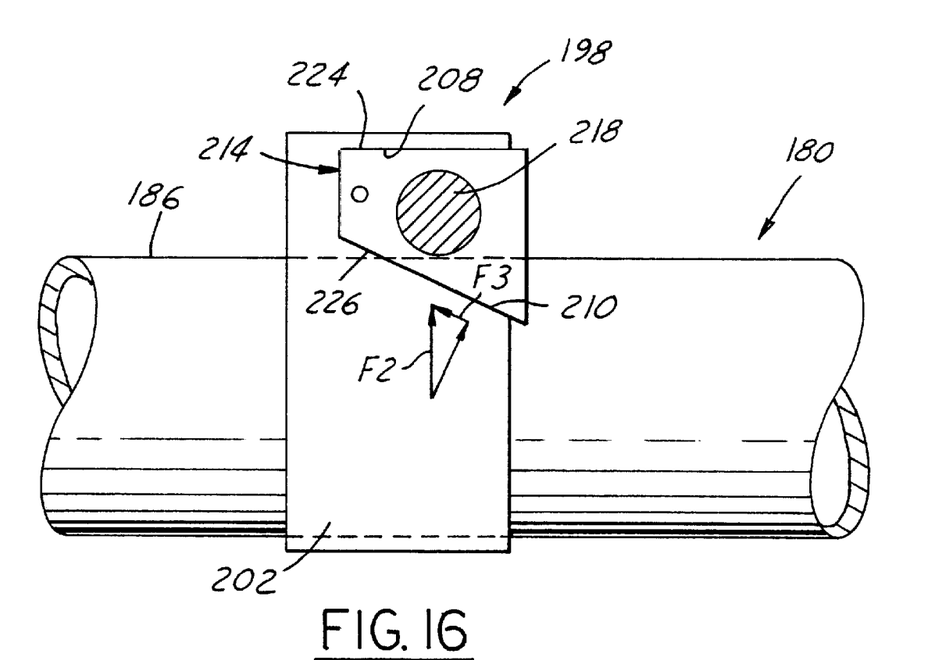
FIG. 16 is essentially the same as FIG. 15, but with different directional arrows.

A mounting bracket 198 is provided for the steering column 180. The mounting bracket 198 is rigidly secured to the upper jacket 186. The mounting bracket is generally channel-shaped having a bottom wall 200 beneath the upper jacket 186 of the steering column and laterally spaced upwardly extending vertical side walls or plates 202 and 204 on opposite sides of the upper jacket. The side walls each having a notch 206 in the rear edge. The notches of the two plates are transversely aligned. Each notch has a straight top edge 208 and a straight bottom edge 210 which diverge away from one another in a rearward direction at a predetermined angle and open through the rear edge of the notch. The top edge 208 is parallel to the longitudinal axis or center line 212 of the steering column and the bottom edge 210 diverges in a rearward direction away from the top edge at an arcuate angle B to the longitudinal center line.

Shear capsules 214 and 216 are provided. The shear capsules 214 and 216 are identical and are rigidly supported and anchored in fixed positions on opposite sides of the steering column by a transverse bolt or bar 218 which extends horizontally across the top of the upper jacket 186 and is secured in holes 220 in the capsules. The bar 218 is secured to rigid frame structure of the vehicle.

Each shear capsule has a configuration similar to the configuration of the notches 206. Each shear capsule is in the form of a flat plate which is wider or thicker than the side walls 202 and 204 of the mounting bracket 198. The top and bottom edges 224 and 226 of each capsule diverge at the same angle as the top and bottom edges 208 and 210 of the notches 206. Each capsule is provided with straight open-ended grooves 228 and 230 along the top and bottom edges 224 and 226 thereof which also diverge at the same angle as the top and bottom edges 208 and 210 of the notches. The grooves 228 and 230 slideably receive the top and bottom edges 208 and 210 of the notches.

Shear pins 232 and 234 are provided to hold the capsules 214 and 216 in the notches 206 of the respective side walls 202 and 204. The shear pins 232 and 234 are preferably made of the same material as the shear pins 142 and 144 described in connection with the first embodiment. The shear pin 232 has its ends received in holes 236 and 238 in the capsule 214 and the side wall 202 of the mounting bracket, and the shear pin 234 has its ends received in holes 240 and 242 in the capsule 216 and the side wall 204.

In the normal operation of the vehicle, the capsules 214 and 216 are held in the notches 206 of the side walls 202 and 204 by the shear pins 232 and 234, preventing collapse of the steering column 180. However, in a frontal vehicle impact of great magnitude, when the driver is thrown forward and his chest strikes the steering wheel, the pins 232 and 234 shear and the upper jacket 186 collapses and telescopes relative to the lower jacket 184.

When entering or leaving a vehicle, the driver will often grasp the steering wheel and apply a downward force. This force is represented by the vector F1 in FIG. 15 and is perpendicular to the central axis of the steering column. It is resisted by the capsules 214 and 216. The force is applied by contact of the top edges 208 of the notches 206 of the side walls 202 and 204 of the mounting bracket 198 against the bottoms of the grooves 228 along the top edges 224 of the capsules. This force is perpendicular to such contact surfaces and hence does not place any stress on the shear pins 232 and 234 and thus will not accidentally shear the pins and allow the steering column to collapse.

However in a sudden and violent frontal impact event, when the driver is thrown forward against the steering wheel, the force against the steering column may be great enough to shear the pins 232 and 234 and allow the steering column to collapse. During such an event, the force of the driver against the steering wheel typically applies an upward force on the steering column represented by the vector F2 in FIG. 16 and is applied by contact of the bottom edges 210 of the notches against the bottoms of the grooves 230 along the bottom edges 226 of the capsules. This force is perpendicular to the central axis of the steering column but is not perpendicular to such contact surfaces and in fact has a component F3 in a direction which increases the stress on the shear pins and thus assists in causing the shear pins to shear, promoting collapse of the steering column.

The disclosed embodiments are representative of presently preferred forms of the invention, but are intended to be illustrative rather than definitive thereof. The invention is defined in the claims.

What is claimed is:

1. A locking system for an adjustable steering column of a vehicle having adjustment components which are relatively movable to permit adjustment of the position of the column, said locking system comprising:

a fixed bracket having a set of forward bracket teeth associated with rake adjustment components of the column;

a tooth lock having teeth opposing the forward bracket teeth, a traverse rake bolt associated with said tooth lock, said rake bolt being rotatable between a first rotative position for moving the teeth of the tooth lock out of engagement with teeth of the bracket, and a second rotative position permitting relative movement of the tooth lock forward toward the teeth of the bracket;

an actuator constantly acting forwardly on the tooth lock for positively moving the tooth lock forward toward the bracket teeth to a locking position in which the teeth of the tooth lock are engaged with the bracket teeth when the rake bolt is in the second rotative position; and a device operable in response to application of an impact force on the column in a collision event in a direction to collapse the column for moving the rake bolt forwardly relative to the tooth lock when in the locked position into abutting engagement with the tooth lock for positively retaining the tooth lock in the locking position.

2. The system of claim 1, wherein the actuator includes a spring bearing against the tooth lock.

3. A steering column assembly comprising:

an elongated steering column supported for up and down rake adjustment;

a first and second rake brackets on respective opposite sides of the steering column;

a compression bracket secured to the steering column;

said first rake bracket having a vertically elongated first rake slot and a vertical series of rake slot teeth on a front side of the first rake slot;

said second rake bracket having a vertically elongated second rake slot transversely aligned with the first rake slot;

a transverse rake bolt having a first end disposed in said first rake slot and a second end disposed in said second rake slot and extending through an opening in the compression bracket;

a tooth lock supported in the first rake slot on said rake bolt, said tooth lock having teeth opposing the rake slot teeth;

said bolt being axially rotatable to a first rotative position for moving said tooth lock rearwardly to a retracted position with the teeth of the tooth lock out of engagement with the rake slot teeth to enable rake adjustment of the steering column;

said bolt being axially rotatable to a second rotative position permitting movement of the tooth lock forwardly to a locking position in which the teeth of the tooth lock are engaged with the rake slot teeth to maintain an established rake adjustment of the steering column;

a spring mounted on the first rake bracket for moving the tooth lock to said locking position when said bolt is rotated to the second rotative position thereof; and said bolt, when said tooth lock is in the locking position and said bolt is in the second rotative position, being movable forwardly, in response to an application of an impact force on the column in a collision event in a direction to collapse the steering column, into bearing abutment with the tooth lock to positively retain the tooth lock in the locking position.

4. The steering column assembly of claim 3, further including at least one shear pin operable to resist collapse or the steering column except upon the application of the impact force in which event the shear pin is adapted to shear.

5. The steering column assembly of claim 3, wherein said steering column has a jacket assembly including telescoping upper and lower jackets, and said compression bracket is secured to the upper jacket.

6. The column assembly of claim 5, wherein said compression bracket has laterally spaced, parallel side wells on opposite sides of the upper jacket of the steering column, said opening in the compression bracket comprises transversely aligned, elongated compression bracket slots in the respective side walls extending generally parallel to the steering column, and a tubular capsule through which said bolt extends, said capsule having ends slideable lengthwise in the respective compression bracket slots.

7. The steering column assembly of claim 3, wherein said second rake slot has a front wall which blocks forward movement of the second end of the bolt in the second rotative position of said bolt, the front wall of said second rake slot being deformable to permit forward movement of the second end of said bolt in response to the application of said impact force.

8. The steering column assembly of claim 6, wherein said second rake slot has a front wall which blocks forward movement of the second end of said bolt in the second rotative position of said bolt, and said second rake bracket has a slit spaced forwardly of the second rake slot to make the front wall of said second rake slot deformable to permit forward movement of the second end of the bolt in response to the application of the impact force.

9. The column assembly of claim 3, wherein said compression bracket has laterally spaced, parallel side walls on opposite sides of the upper jacket of the steering column, said opening in the compression bracket comprises transversely aligned, elongated compression bracket plots in the respective side walls extending generally parallel to the steering column, and a tubular capsule through which said bolt extends, said capsule having ends slideable lengthwise in the respective compression bracket slots.

10. The steering column assembly of claim 9, further including at least one shear pin to resist collapse of the steering column except upon the application of the impact force in which event the shear pin is adapted to shear.

11. The steering column of claim 10, wherein said shear pin fits into registering openings in the capsule and the compression bracket.

12. The steering column assembly of claim 8, further including an energy absorption mechanism, said energy absorption mechanism including a generally U-shaped strap having a mid portion extending over said capsule and an end portion secured to said compression bracket, said strap being adapted to be bent around the capsule and then restraightened during collapse of the steering column to absorb energy.

13. The steering column assembly of claim 12, wherein a space is normally provided between the mid portion of the strap and the capsule so that upon initial collapse of the steering column inertial effects of high initiation loads are eliminated and the tendency of the capsule to bind is reduced.

14. The steering column assembly of claim 13, wherein the space is on the order of about 5 millimeters.

15. The steering column assembly of claim 14, wherein the bottoms of the compression bracket slots at the forward ends thereof are tapered about 15° to the lengthwise dimension of said compression bracket slots and the ends of said capsules are correspondingly tapered to substantially reduce lash between said compression bracket slots and the ends of said capsules and to reduce sticking of the capsule upon initial collapse of the steering column.

* * * * *